US010889705B2

(12) United States Patent
Bergqvist et al.

(10) Patent No.: US 10,889,705 B2
(45) Date of Patent: Jan. 12, 2021

(54) CROSSLINKED POLYMER COMPOSITION FOR CABLE ACCESSORIES

(71) Applicant: BOREALIS AG, Vienna (AT)

(72) Inventors: Mattias Bergqvist, Gothenburg (SE); Martina Sandholzer, Linz (AT); Davide Domenico Tranchida, Linz (AT); Johan Andersson, Hisings Backa (SE); Villgot Englund, Gothenburg (SE); Thomas Hjertberg, Kungshamn (SE)

(73) Assignee: BOREALIS AG, Vienna (AT)

( * ) Notice: Subject to any disclaimer, the term of this patent is extended or adjusted under 35 U.S.C. 154(b) by 101 days.

(21) Appl. No.: 16/096,029

(22) PCT Filed: Mar. 30, 2017

(86) PCT No.: PCT/EP2017/057612
§ 371 (c)(1),
(2) Date: Oct. 24, 2018

(87) PCT Pub. No.: WO2017/186451
PCT Pub. Date: Nov. 2, 2017

(65) Prior Publication Data
US 2019/0136022 A1 May 9, 2019

(30) Foreign Application Priority Data
Apr. 27, 2016 (EP) ..................... 16167231

(51) Int. Cl.
C08L 23/08 (2006.01)
C08F 210/02 (2006.01)
C08K 3/04 (2006.01)
C08K 5/14 (2006.01)
H01B 3/00 (2006.01)
H01B 3/44 (2006.01)
C08K 3/14 (2006.01)
C08K 3/22 (2006.01)

(52) U.S. Cl.
CPC ........ *C08L 23/0815* (2013.01); *C08F 210/02* (2013.01); *C08K 3/04* (2013.01); *C08K 3/14* (2013.01); *C08K 3/22* (2013.01); *C08K 5/14* (2013.01); *H01B 3/004* (2013.01); *H01B 3/441* (2013.01); C08F 2500/03 (2013.01); C08F 2500/12 (2013.01); C08F 2800/20 (2013.01); C08K 2003/2231 (2013.01); C08K 2003/2241 (2013.01); C08K 2003/2296 (2013.01); C08K 2201/001 (2013.01); C08L 2203/20 (2013.01); C08L 2310/00 (2013.01); C08L 2312/00 (2013.01)

(58) Field of Classification Search
CPC ............ C08L 23/0815; C08L 2312/00; C08L 2310/00; C08L 2203/20; C08F 210/02; C08F 2500/03; C08F 2500/12; C08F 2800/20; C08K 3/04; C08K 3/14; C08K 3/22; C08K 2203/2231; C08K 2203/2241; C08K 2203/2296; H01B 3/004; H01B 3/441
USPC ........................................................ 524/424
See application file for complete search history.

(56) References Cited

U.S. PATENT DOCUMENTS

| | | | | |
|---|---|---|---|---|
| 8,603,635 B2 * | 12/2013 | Esseghir | ............. | C08L 23/0815 428/423.1 |
| 2010/0240784 A1 * | 9/2010 | Moscardi | ................ | C08L 23/16 521/144 |
| 2012/0171496 A1 * | 7/2012 | Esseghir | ................. | C08L 83/04 428/423.1 |
| 2016/0108239 A1 * | 4/2016 | Cree | .................... | C09D 183/04 428/447 |

FOREIGN PATENT DOCUMENTS

| | | | | |
|---|---|---|---|---|
| WO | 9858021 A1 | 12/1998 | | |
| WO | 2011037747 A2 | 3/2011 | | |
| WO | WO-2011037747 A2 * | 3/2011 | ............. | C08L 75/04 |
| WO | WO-2012007609 A1 * | 1/2012 | ............ | H04W 12/06 |
| WO | 2012067609 A1 | 5/2012 | | |
| WO | 2014209543 A1 | 12/2014 | | |
| WO | WO-2014209543 A1 * | 12/2014 | ............... | C08K 5/57 |

OTHER PUBLICATIONS

International Search Report and Written Opinion dated May 23, 2017 in International Application No. PCT/EP2017/057612.
Office Action dated Aug. 4, 2020 in corresponding CN Application No. 2017800245528 (English translation).
Yan Feng "Crosslinking and application of metallocene polyethylene elastomer," Rubber Industry, 2004, vol. 51 (with partial translation).

* cited by examiner

*Primary Examiner* — Michael Bernshteyn
(74) *Attorney, Agent, or Firm* — Meunier Carlin & Curfman LLC

(57) ABSTRACT

A crosslinked polymer composition based on a plastomer, which is suitable for producing at least one layer of cable accessories like cable joints, bushings or terminations; its use for preparing such a layer and the cable accessory comprising the composition.

15 Claims, No Drawings

CROSSLINKED POLYMER COMPOSITION FOR CABLE ACCESSORIES

The present invention is related to a crosslinked polymer composition based on a plastomer, which is suitable for producing at least one layer of cable accessories like cable joints, bushings or terminations; its use for preparing such a layer and the cable accessory comprising the composition.

BACKGROUND ART

Cable accessories include for example joints or splices, bushings and terminations. Limitations of e.g. manufacture, transportation and installation require cables to be joined in the field when the length exceeds a certain value. Terminations are for example required where cables are connected to overhead lines or other equipment such as high voltage power electronics or transformers and converter stations.

Cables are for example power or communication cables.

A power cable is defined to be a cable transferring energy operating at any voltage, typically operating at voltages higher than 1 kV, like power cables operating at voltages higher than 6 kV to 36 kV, i.e. medium voltage (MV) cables and at voltages higher than 36 kV, known as high voltage (HV) cables and extra high voltage (EHV) cables, which EHV cables operate, as well known, at very high voltages. The terms have well known meanings and indicate the operating level of such cables.

The voltage applied to the power cable can be alternating (AC), direct (DC), or transient (impulse).

LV power cable and in some embodiment medium voltage (MV) power cables usually comprise an electric conductor which is coated with an insulation layer. Typically MV and HV power cables comprise a conductor surrounded at least by an inner semiconductive layer, an insulation layer and an outer semiconductive layer, in that order.

The predominate insulation material for insulated power cables has historically been oil impregnated taped paper laminate in various forms such as MIND (Mass Impregnated Non-Draining), SCFF (Self Contained Fluid Filled), LPFF (Low Pressure Fluid-Filled). For the last decades the extruded cross-linked polyethylene (XLPE) or ethylene propylene rubber (EPR) for extruded cables has had a dominant position.

A power cable network must be capable of supplying electric power without interruption. If a failure does occur, it is rarely the cable as such but at the points of jointing and termination where the cable and accessories has been handled. The quality of the jointing is much more dependent on the workmanship of the installer than the cable. So it pays to choose cable accessories with care in order to minimise any problem that can arise during installation and to minimise the influence of the installer.

The most widely used joints are pre-molded joints, factory/flexible joints, repair joints and transition joints, whereby pre-molded joints are the most commonly used joint type to join extruded cables in the field.

Nowadays silicon rubber and ethylene-propylene rubbers (EPR) are mainly used in the preparation of pre-molded joints, especially for medium voltage (MV), high voltage (HV) and extra high voltage (EHV) cables.

EPR is a thermoset material synthesized from ethylene, propylene and, in many instances, a third monomer. If only ethylene and propylene are used, the polymer may be referred to as EPM. If three monomers are used, the resulting polymer is called EPDM. Peroxide is the predominant cross-linking agent for EPR compounds.

Such pre-molded joints have in general at least one insulation layer and one semi-conductive layer.

In the literature several compositions suitable for preparing insulating layers or semi-conductive layers are described.

For Example WO 98/58021 describes a low modulus composition, being suitable for preparing the insulation layer of such a pre-molded joint, which is composed of a composition comprising:

(a) between 20 and 45 parts by weight of a semi-crystalline elastomer having between 1 and 15% crystallinity and (b) between 80 and 55 parts by weight of a compatible liquid elastomer (like liquid EPDMs) having a number-average molecular weight ($M_n$) of between 1,500 and 8,500, whereby preferably, the composition is crosslinked.

WO 2011/037747 describes a semi-conductive layer which comprises an olefin elastomer, a non-olefin elastomer, and conductive filler and optionally peroxide. In Comparative Example 1 a composition is described which is composed of 63.4 wt % of Engage 7447 (DOW, ethylene-1-butene elastomer, density 865 kg/m³, Shore A hardness of 64), 2.5 wt % of dicumyl peroxide and 34.1 wt % of a specific carbon black as conductive filler. The composition of this Comparative Example 1 has a Shore A hardness of 85 and an elongation at break of 291%. In order to improve the performance (i.e. lowering Shore A hardness and increasing elongation at break) of the composition a non-olefin elastomer and preferably also a plasticizer has to be added to the composition in the inventive Examples of this application.

One problem encountered with cable joints is the fact that most failures in cable networks occur in the cable joints.

It is known that in order to avoid failures, the material used for preparing such joints should a) maintain high interfacial pressure between the cable and the joint and b) be soft enough to fill cavities which can occur during fixing the joint over the cable.

A key property in this respect is the so called compression set value. This value describes the resistance to creep during compression. A sufficiently good (i.e. low) compression set value makes the material less prone to creep under compression at operational temperatures.

None of the above cited patent applications is related to this issue.

Thus, although a lot of development work has already been done in the field of cable joints, there is still a further need for providing material that has such a sufficiently low compression set value and is at the same time soft enough to fill cavities which can occur during fixing the joint over the cable.

SUMMARY OF THE INVENTION

The object of the present invention is therefore to provide a material which is suitable for producing at least one layer of cable accessories like cable joints or terminations and having an advantageous combination of softness and compression set value.

The present invention provides a crosslinked polymer composition comprising a) at least a crosslinked plastomer, whereby the non-crosslinked plastomer fulfils the characteristics (i) and (ii)
  (i) being a copolymer of ethylene and a $C_4$ to $C_8$ alpha olefin comonomer and
  (ii) having a density (according to ISO 1183) in the range of 855 kg/m³ to 890 kg/m³, b) optionally conductive fillers,
whereby the composition has
- a Shore A hardness value measured according to ISO 868 of equal to or below 80 and
- an elongation at break measured according to ISO 527-2 of at least 300% and
- wherein other polymers than the plastomer are substantially absent.

In a preferred embodiment the crosslinked polymer composition has a compression set value measured according to DIN ISO 815 B (150° C., 24 h) of below 25%, more preferred of below 20%.

In another preferred embodiment the crosslinked polymer composition has a hot set elongation measured according to EN60811-2-1 after 15 min at 200° C. and a load of 20 N/mm$^2$ of less than 100%, preferably of less than 80%, more preferably of less than 60%, even more preferably of less than 50% and most preferably of less than 40%.

In a further embodiment the crosslinked polymer composition, i.e. the crosslinked plastomer has been prepared by crosslinking the plastomer via peroxide crosslinking, preferably via peroxide crosslinking with 0.1 to max 2.0 wt % of a peroxide being liquid at ambient temperature.

Yet a further embodiment is related to the use of the composition to prepare insulation layers and semi-conductive layers, preferably insulation layers and such layers comprising the above defined composition.

An additionally embodiment is related to pre-molded cable joints comprising at least one insulation layer made from the crosslinked polymer composition according to the present invention.

DESCRIPTION OF THE INVENTION

The crosslinked polymer composition according to the present invention comprises at least one plastomer a), which is crosslinked.

The plastomer a) is the sole polymer component of the composition, thus other polymers than the plastomer a) are substantially absent.

Plastomer means herein a very low density polyolefin, more preferably very low density polyolefin polymerized using a single site catalyst, suitably a metallocene catalyst.

The density (according to ISO 1183) of the plastomers being suitable for the present invention is in the range of 855 kg/m$^3$ to 890 kg/m$^3$, preferably 860 kg/m$^3$ to 880 kg/m$^3$ and more preferably 862 kg/m$^3$ to 875 kg/m$^3$.

Such plastomers are copolymers of ethylene and a $C_4$ to $C_8$ alpha-olefin comonomer. $C_4$ to $C_8$ alpha-olefin comonomers are for example 1-butene, 1-hexene or 1-octene. Preferably the comonomer is 1-butene or 1-octene, more preferably the comonomer is 1-octene.

The amount of comonomer is usually in the range of 20.0 wt % to 45.0 wt %, depending on the chosen comonomer and the desired density.

The melt flow rate (MFR, according to ISO 1133, 2.16 kg and 190° C.) of such plastomers is in the range of 0.1 g/10 min up to 50.0 g/10 min, preferably 0.2 g/10 min up to 35.0 g/min and more preferably 0.5 g/10 min up to 10.0 g/10 min.

The melting points (measured with DSC according to ISO 11357-1) of suitable plastomers are below 100° C., preferably below 90° C. and more preferably below 80° C.

The molecular weight distribution Mw/Mn of suitable plastomers is preferably in the range of 2.0 to 4.0, preferably in the range of 2.2 to 3.8 and more preferably in the range of 2.5 to 3.6.

These ethylene based plastomers can be prepared by known processes, in a one stage or two stage polymerization process, comprising solution polymerization, slurry polymerization, gas phase polymerization or combinations therefrom, in the presence of suitable metallocene catalysts, known to the art skilled persons.

Preferably these ethylene based plastomers are prepared by a one stage or two stage solution polymerization process, especially by high temperature solution polymerization process at temperatures higher than 100° C.

Such process is essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably the solution polymerization process is a high temperature solution polymerization process, using a polymerization temperature of higher than 100° C. Preferably the polymerization temperature is at least 110° C., more preferably at least 150° C. The polymerization temperature can be up to 250° C.

The pressure in such a solution polymerization process is preferably in a range of 10 to 100 bar, preferably 15 to 100 bar and more preferably 20 to 100 bar.

The liquid hydrocarbon solvent used is preferably a $C_{5-12}$-hydrocarbon which may be unsubstituted or substituted by $C_{1-4}$ alkyl group such as pentane, methyl pentane, hexane, heptane, octane, cyclohexane, methylcyclohexane and hydrogenated naphtha. More preferably unsubstituted $C_{6-10}$-hydrocarbon solvents are used.

A known solution technology suitable for the process according to the invention is the COMPACT technology.

Such suitable plastomers are also commercial available, i.a. from *Borealis* under the tradename Queo, from DOW Chemical Corp (USA) under the tradename Engage or Affinity, or from Mitsui under the tradename Tafmer.

According to the invention the polymer composition, i.e. the plastomer is crosslinked. Crosslinking may be carried out by different means, such as for example by radical reaction (e.g. by organic peroxides), by a sulphur vulcanizing system or also by irradiation.

Preferably the plastomer is crosslinked by the use of organic peroxides as crosslinking agent. More preferably crosslinking is initiated with a peroxide that is liquid at ambient temperatures (e.g. room temperature), like tert-butyl cumyl peroxide, 2,5-Dimethyl-2,5-di(tert-butylperoxy)hexyne-3,2,5-Dimethyl-2,5-di(tert-butylperoxy) hexane, 3,3,5,7,7-Pentamethyl-1,2,4-trioxepane tert-Butylperoxy 2-ethylhexyl carbonate, etc. Such peroxides are well known to the art skilled person. They are commercially available from e.g. AkzoNobel under the Tradename Trigonox® or from Arkema under the Tradename Luperox®. Examples are Trigonox® 101, Luperox® 101, Trigonox® 145-E85, Trigonox® T, Luperox® 801, etc. It is also possible to use two or more different types of peroxide, which are liquid at ambient temperatures (i.e. room temperature). Preferably only one kind of peroxide is used.

The peroxide or peroxide mixture is used in an amount of 0.1 wt % up to maximum 2.0 wt %, preferably 0.1 wt % up to 1.8 wt %, based on the polymer composition.

Thus in a preferred embodiment the polymer composition according to the present invention is prepared by crosslinking the plastomer with 0.1 to max 2.0 wt % of a peroxide or peroxide mixture being liquid at ambient temperature.

The plastomer suitable for the present invention can be in a well-known powder, grain or pellet form. Pellets mean herein generally any polymer product which is formed from reactor-made polymer (obtained directly from the reactor) by post-reactor modification into solid polymer particles. A well-known post-reactor modification process is pelletizing a melt-mix of polymer component(s) and optional additive(s) in a pelletizing equipment to form solid pellets. Pellets can be of any size and shape.

The crosslinking agent, e.g. the peroxide, can be incorporated into the plastomer, e.g. plastomer pellets, to form a product, preferably a pellet product, wherein the product, preferably pellet product, comprises the plastomer component together with the crosslinking agent. The crosslinking agent can be incorporated into the plastomer e.g. by melt-mixing with the plastomer and by pelletizing the obtained melt-mix or by impregnating the crosslinking agent into the solid plastomer pellets.

Alternatively, the crosslinking agent can be provided in a well-known master batch or can be directly injected into the device, e.g. the extruder, wherein the crosslinking takes place.

Preferably the plastomer is impregnated with peroxide or the peroxide is added as master batch, more preferably the plastomer is impregnated with peroxide.

In the crosslinking process crosslinking conditions can vary depending i.a. on the used materials. The crosslinking is effected e.g. in a known manner, preferably at an elevated temperature. Preferably the lowest temperature during the crosslinking step is above 140° C., more preferably above 150° C. The crosslinking may be carried out in a liquid or gas medium, such as in an inert gas, such as $N_2$, atmosphere.

The crosslinking step is carried out under pressurized conditions to prevent the formation of voids due to volatile decomposition products of e.g. peroxides.

The pressure during the crosslinking step of the invention is typically up to 200 bar, like up to 180 bar, preferably up to 160 bar in inert atmosphere.

The plastomers achieve the desired elastic properties when being crosslinked.

Said crosslinked polymer composition may comprise further components, typically additives, such as antioxidants, crosslinking boosters, scorch retardants, processing aids, fillers, coupling agents, ultraviolet absorbers, stabilisers, antistatic agents, nucleating agents, slip agents, plasticizers, lubricants, viscosity control agents, tackifiers, anti-blocking agents, surfactants, extender oils, acid scavengers and/or metal deactivators. The content of said additives may preferably range from 0 to 8 wt %, based on the total weight of the crosslinked polymer composition.

According to the present invention it is also possible that the crosslinked polymer composition comprises conductive fillers.

Suitable conductive fillers are conductive carbon blacks and metal particulates, preferably conductive carbon black.

The carbon black can be any conventional carbon black used in the semi-conductive layers of a power cables and cable accessories.

Preferably the carbon black has one or more of the following properties: a) a primary particle size of at least 5 nm which is defined as the number average particle diameter according ASTM D3849-95a, b) iodine number of at least 30 mg/g according to ASTM D1510, c) oil absorption number of at least 30 ml/100 g which is measured according to ASTM D2414.

Non-limiting examples of carbon blacks are e.g. acetylene carbon black, furnace carbon black and Ketjen carbon black, preferably furnace carbon black and acetylene carbon black.

Additionally non-linear conductive fillers, which improve the electrical field grading properties, can be added. Such suitable non-linear conductive fillers are silicon carbide (SiC), zinc oxide (ZnO), which is optionally doped with up to 15% of various metal oxides, furthermore $SnO_2$, $TiO_2$ or conductive polymers, like the emeraldine base of polyaniline (PANI-EB).

If conductive fillers are present in the polymer composition according to the present invention, the amount of conductive fillers, like carbon black, is at least such that a semiconducting composition is obtained.

Depending on the desired use, the conductivity of conductive filler, like the carbon black and conductivity of the composition, the amount of conductive filler, like carbon black can vary. Preferably, the polymer composition comprises 10 to 50 wt % conductive filler, preferably carbon black, based on the weight of the composition.

The conductive fillers, if present, are added to the plastomer before crosslinking.

The crosslinked polymer composition according to the present invention is characterized by the following properties:

The crosslinked polymer composition has a Shore A hardness value measured according to ISO 868 of equal to or below 80, preferably below 75.

The crosslinked polymer composition furthermore has an elongation at break measured according to ISO 527-2 of at least 300%, preferably at least 400%.

The compression set is a measure for the material's ability to retain its elastic properties after prolonged exposure to compressive stresses. When rubbery materials are held under compression, physical or chemical changes can occur that prevent the rubber returning to its original dimension after release of the deforming force. The compression set of a material is defined as the permanent deformation remaining after the deforming force has been removed.

Thus in a preferred embodiment the crosslinked polymer composition has in addition a compression set value measured according to DIN ISO 815 B (150° C., 24 h) of below 25%, preferably below 20%.

Furthermore it is preferred that the crosslinked polymer composition according to the present invention has a hot set elongation measured according to EN60811-2-1 after 15 min at 200° C. and a load of 20 $N/mm^2$ of less than 100%, preferably of less than 80%, more preferably of less than 60% more preferably of less than 60%, even more preferably of less than 50% and most preferably of less than 40%.

For cable insulation the standard (i.e. IEC 62067) states a maximum elongation after 15 min at 200° C. with 20 $N/mm^2$ of 175%, but in the business a hot set value below 100% is established as a good crosslinked network.

The crosslinked polymer composition according to the present invention reaches even lower values, meaning that the high temperature creep properties are superior and that the materials have a densely crosslinked network.

Due to the above described advantageous properties of the crosslinked polymer composition of the present invention, the composition can be used for preparing insulation layers as well as semi-conductive layers of cable accessories, like cable joints or terminations.

Preferably the composition is used for preparing insulation layers as well as semi-conductive layers of pre-molded cable joints. More preferably the composition is used for preparing insulation layers of pre-molded cable joints.

A further embodiment of the present invention is therefore also insulation layers and semi-conductive layers of cable accessories comprising the crosslinked polymer composition of the present invention, preferably insulation layers and semi-conductive layers of pre-molded cable joints and more preferably insulation layers of pre-molded cable joints.

Yet a further embodiment of the present invention is therefore a pre-molded cable joint comprising at least one insulation layer made from the crosslinked polymer composition of the present invention.

Experimental Part

Methods

Sample Preparation for Mechanical Tests

Compression moulded plaques (4 mm thickness) were prepared using a compression moulding program consisted of a melting stage at 20 bar pressure at 130° C., followed by an increase in pressure to 160 bars and an increase in temperature to 180° C. This ensured that the material is properly molten before peroxide decomposition. Tert.-butyl cumyl peroxide (Luperox 801, 1.5 wt %) was used to initiate cross-linking. After the moulding the plaques were degassed in 70° C. for 24 hours.

Shore A

Shore A hardness value is measured according to ISO 868 on test specimens prepared according to above described sample preparation method.

Elongation at Break

Elongation at break is measured according to ISO 527-2 on test specimens prepared according to above described sample preparation method. The measurement was conducted at 23° C. temperature with a cross head speed of 250 mm/min for determining elongation at break.

Compression Set

The compression set value is measured according to DIN ISO 815 B (150° C., 24 h)

Hot Set Elongation Test

Compression molded plaques with 1 mm thickness were prepared using the same method for crosslinking as described above.

The hot set test was made according to EN60811-2-1 (hot set test) by measuring the thermal deformation.

Three dumb-bells sample were prepared according to ISO 527 5A from the 1 mm thick crosslinked plaques.

Reference lines, were marked 20 mm apart on the dumb-bells. Each test sample was fixed vertically from upper end thereof in the oven and the load of 20 N/mm$^2$ was attached to the lower end of each test sample. After 15 min, 200° C. in oven the distance between the pre-marked lines were measured and the percentage hot set elongation calculated, elongation %. The average of the three tests was reported.

MFR$_2$ (190° C.) is measured according to ISO 1133 (190° C., 2.16 kg load).

Density is measured according to ISO 1183.

Melting Temperature Tm

The melting temperature Tm was measured with a TA Instruments Q2000 differential scanning calorimetry device (DSC) according to ISO 11357-3 on 5 to 10 mg samples. Melting temperatures were obtained in a heat/cool/heat cycle with a scan rate of 10° C./min between 30° C. and 180° C. Melting and crystallisation temperatures were taken as the peaks of the endotherms and exotherms in the cooling cycle and the second heating cycle respectively.

Number average molecular weight (Mn), weight average molecular weight (Mw) and polydispersity (Mw/Mn) are determined by Gel Permeation Chromatography (GPC) according to the following method:

The weight average molecular weight Mw and the polydispersity (Mw/Mn), wherein Mn is the number average molecular weight and Mw is the weight average molecular weight) is measured by a method based on ISO 16014-1: 2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Comonomer content in polyethylene was measured in a known manner based on Fourier transform infrared spectroscopy (FTIR) calibrated with 13C-NMR, using Nicolet Magna 550 IR spectrometer together with Nicolet Omnic FTIR software.

Films having a thickness of about 250 µm were compression molded from the samples. Similar films were made from calibration samples having a known content of the comonomer. The comonomer content was determined from the spectrum from the wave number range of from 1430 to 1100 cm−1. The absorbance is measured as the height of the peak by selecting the so-called short or long base line or both. The short base line is drawn in about 1410-1320 cm−1 through the minimum points and the long base line about between 1410 and 1220 cm−1. Calibrations need to be done specifically for each base line type. Also, the comonomer content of the unknown sample needs to be within the range of the comonomer contents of the calibration samples.

EXAMPLES

Materials Used:

3 ethylene-octene plastomers (P1, P2 and P3) were used in the experiments. The plastomers were produced in a solution polymerisation process (Compact technology) using a metallocene catalyst and had the following properties as shown in Table 1.

The plastomers are commercially available from *Borealis* under the trade names Queo 7001LA (P1), Queo 6800LA (P2) and Queo 7007LA (P3).

TABLE 1

|  | Property | Unit | Value |
|---|---|---|---|
| Plastomer P1 | Density | kg/m$^3$ | 870 |
|  | MFR$_2$ | g/10 min | 1 |
|  | Melting point | ° C. | 56 |
|  | C$_8$ content | wt % | 30.7 |
|  | C$_2$ content | wt % | 69.3 |
|  | MWD |  | 3.2 |
| Plastomer P2 | Density | kg/m$^3$ | 868 |
|  | MFR$_2$ | g/10 min | 0.5 |
|  | Melting point | ° C. | 49 |
|  | C$_8$ content | wt % | 31.3 |
|  | C$_2$ content | wt % | 68.7 |
|  | MWD |  | 3.4 |
| Plastomer P3 | Density | kg/m$^3$ | 870 |
|  | MFR$_2$ | g/10 min | 6.6 |
|  | Melting point | ° C. | 48 |

TABLE 1-continued

| Property | Unit | Value |
|---|---|---|
| $C_8$ content | wt % | 33.0 |
| $C_2$ content | wt % | 77.0 |
| MWD | | 2.6 |

In addition three commercial available plastomers were used (Engage 8100, 8150 and 8842, all commercial available from DOW):

TABLE 2

| | Property | Unit | Value |
|---|---|---|---|
| Engage 8100 (P4) | Density | kg/m³ | 870 |
| | $MFR_2$ | g/10 min | 1 |
| | Melting point | ° C. | 60 |
| | $C_8$ content | wt % | 33.0 |
| | $C_2$ content | wt % | 67.0 |
| | MWD | | 2.7 |
| Engage 8150 (P5) | Density | kg/m³ | 868 |
| | $MFR_2$ | g/10 min | 0.5 |
| | Melting point | ° C. | 55 |
| | $C_8$ content | wt % | 33.6 |
| | $C_2$ content | wt % | 63.4 |
| | MWD | | 2.1 |
| Engage 8842 (P6) | Density | kg/m³ | 857 |
| | $MFR_2$ | g/10 min | 1 |
| | Melting point | ° C. | 38 |
| | $C_8$ content | wt % | 39.2 |
| | $C_2$ content | wt % | 60.8 |
| | MWD | | 2.7 |

Crosslinking

The plastomers were impregnated with Luperox® 801 (tert-butyl cumyl peroxide, provided by Arkema) at room temperature for 5 hours and then converted into compression moulded plaques as described under Sample Preparation for mechanical tests.

The amounts of peroxide added and the properties of the crosslinked polymer composition can be seen in Table 3

TABLE 3

| | | Plastomer | | | | | |
|---|---|---|---|---|---|---|---|
| | | P1 | P2 | P3 | P4 | P5 | P6 |
| POX | wt % | 1.5 | 1.5 | 1.5 | 1.5 | 1.5 | 1.5 |
| EAB | % | 551 | 555 | 614 | 633 | 633 | 431 |
| Shore A | | 74 | 73 | 72 | 73 | 70 | 53 |
| CS | % | 7.3 | 7.7 | 17 | 19 | 16 | 16 |
| HS | % | 11 | 11 | 20 | 20 | 18 | 22 |

POX Luperox 801
EAB elongation at break
CS compression set (150° C., 24 h)
HS hot set, elongation after 15 min

The invention claimed is:

1. A crosslinked polymer composition comprising:
a plastomer, wherein the plastomer is a copolymer of ethylene and a $C_4$ to $C_8$ alpha olefin comonomer and wherein the plastomer has a density (according to ISO 1183) in the range of 855 kg/m³ to 890 kg/m³,
wherein the crosslinked polymer composition has:
a Shore A value measured according to ISO 868 of equal to or below 80,
an elongation at break measured according to ISO 527-2 of at least 300%, and
wherein polymers other than the plastomer are absent.

2. The crosslinked polymer composition according to claim 1, wherein the crosslinked polymer composition has a compression set value, measured according to DIN ISO 815 B (150° C., 24 h), of below 25%.

3. The crosslinked polymer composition according to claim 1, wherein the crosslinked polymer composition has a hot set elongation, measured according to EN60811-2-1 after 15 min at 200° C. and a load of 20 N/mm², of less than 100%.

4. The crosslinked polymer composition according to claim 1, wherein the plastomer has
(i) a comonomer content in the range of 20.0 wt % to 45.0 wt %,
(ii) a melt flow rate (ISO 1133, 2.16 kg and 190° C.) in the range of 0.1 g/10 min up to 50.0 g/10 min,
(iii) a melting point (DSC, ISO 11357-1) below 100° C., and
(iv) a molecular weight distribution Mw/Mn in the range of 2.0 to 4.0.

5. The crosslinked polymer composition according to claim 4, wherein the plastomer is produced in a high temperature solution polymerization process at a temperature higher than 100° C. in the presence of a metallocene catalyst.

6. The crosslinked polymer composition according to claim 1, wherein the crosslinked polymer composition has been prepared by crosslinking the plastomer via peroxide crosslinking.

7. The crosslinked polymer composition according to claim 6, wherein the crosslinked plastomer has been prepared via peroxide crosslinking with 0.1 to 2.0 wt % of a peroxide, wherein the peroxide is liquid at ambient temperature.

8. The crosslinked polymer composition of claim 1, further comprising a conductive filler.

9. The crosslinked polymer composition according to claim 8, wherein the conductive filler is selected from the group consisting of acetylene carbon black, furnace carbon black, and mixtures thereof, and wherein the conductive filler is added to the plastomer in an amount of 20.0 to 45.0 wt % based on the crosslinked polymer composition before crosslinking the plastomer.

10. The crosslinked polymer composition according to claim 9, further comprising a non-linear conductive filler, selected from the group consisting of silicon carbide (SiC), doped or undoped zinc oxide (ZnO) $SnO_2$, $TiO_2$, and conductive polymers.

11. A method of use of the crosslinked polymer composition according to claim 1 for preparing an insulation layer and/or a semi-conductive layer of a cable accessory.

12. The method according to claim 11, where in the cable accessory is a pre-molded cable joint.

13. An insulation layer and/or a semi-conductive layer of a cable accessory comprising the crosslinked polymer composition according to claim 1.

14. An insulation layer of a pre-molded cable joint comprising the crosslinked polymer composition according to claim 1.

15. A pre-molded cable joint comprising at least one insulation layer, the at least one insulation layer made from the crosslinked polymer composition according to claim 1.

* * * * *